United States Patent
Chiang

(10) Patent No.: US 9,807,228 B1
(45) Date of Patent: Oct. 31, 2017

(54) SYSTEMS AND METHODS FOR IMPROVED CALL HANDLING

(71) Applicant: T-Mobile USA, Inc., Bellevue, WA (US)

(72) Inventor: Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/344,796

(22) Filed: Nov. 7, 2016

(51) Int. Cl.
| | | |
|---|---|---|
| H04M 1/00 | (2006.01) | |
| H04M 1/725 | (2006.01) | |
| H04M 7/00 | (2006.01) | |
| H04M 3/436 | (2006.01) | |
| G06F 3/0483 | (2013.01) | |
| G06F 3/0482 | (2013.01) | |
| G06F 3/0484 | (2013.01) | |
| G06F 9/44 | (2006.01) | |
| H04B 15/00 | (2006.01) | |

(52) U.S. Cl.
CPC ...... *H04M 1/72583* (2013.01); *G06F 3/0482* (2013.01); *G06F 3/0483* (2013.01); *G06F 3/0484* (2013.01); *G06F 9/4443* (2013.01); *H04M 3/436* (2013.01); *H04M 7/0042* (2013.01)

(58) Field of Classification Search
CPC .......... H04M 1/72583; H04M 7/0042; H04M 3/436; G06F 3/0482; G06F 3/0483; G06F 3/0484; G06F 9/4443
USPC ..................... 455/414.1, 416, 417, 566, 567; 379/201.01, 201.04, 207.01, 211.01, 379/211.02, 215.01, 202.01, 157, 158
See application file for complete search history.

(56) References Cited

U.S. PATENT DOCUMENTS

| | | | | |
|---|---|---|---|---|
| 7,986,978 | B2 * | 7/2011 | Katoh ................ | H04M 1/6075 379/211.01 |
| 8,090,087 | B2 * | 1/2012 | Jobs ..................... | H04M 1/576 379/158 |
| 8,249,564 | B2 * | 8/2012 | Chung ............... | H04M 3/4288 379/207.02 |
| 2002/0077158 | A1 * | 6/2002 | Scott .................... | H04M 1/663 455/567 |
| 2007/0142047 | A1 | 6/2007 | Heeschen et al. | |

(Continued)

OTHER PUBLICATIONS

Office action for U.S. Appl. No. 15/287,476, dated Jul. 20, 2017, Inventor #1, "User Customizable Handling of Multiple Calls", 12 pages.

*Primary Examiner* — Lee Nguyen
(74) *Attorney, Agent, or Firm* — Lee & Hayes, PLLC

(57) ABSTRACT

Systems and methods for providing a customizable call handling. The system can include a customizable graphical user interfaces (GUIs) to enable users to reject calls, accept calls, send a customized text message, or place calls on hold when handling one or more incoming calls. The system can enable the user to choose between multiple tabs for call handling. The system can also enable the user to customize where certain features appear in the GUI, including a customizable home screen for frequently user features. The system can enable customized text messaging to differentiate between customers or to differentiate between business and personal contacts. The system can also include machine learning algorithms to customize the GUI based on user's previous actions.

20 Claims, 10 Drawing Sheets

(56) References Cited

U.S. PATENT DOCUMENTS

2011/0111735 A1 5/2011 Pietrow
2013/0029645 A1 1/2013 Schentrup

* cited by examiner

SYSTEMS AND METHODS FOR IMPROVED CALL HANDLING

BACKGROUND

Computers, cellular phones, and other electronic devices are ubiquitous. The combination of the Internet, cellular technologies, and modern electronics, among other things, has created an explosion in the number and types of electronic devices available (e.g., cellular phones, smart phones, tablets, laptops, etc.). Users rely on smart phones, for example, for internet access, e-mail, navigation, and even status.

Increasingly, users rely on smart phones, tablets, and other cellular and internet connected devices as their primary method of communication. Business owners, entrepreneurs, and others may use their smart phone, for example, as their business and personal phone. This can, in turn, increase the number of calls a user receives on their smart phone and increase the incidence of receiving multiple calls at the same time.

Handling multiple calls on a mobile phone can be difficult, however. Some phones provide options for handling one or two calls, but these options are not customizable and do not provide enough options. Simply refusing a call, without some kind of an explanation to the caller, for example, may not be acceptable from a customer service standpoint.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
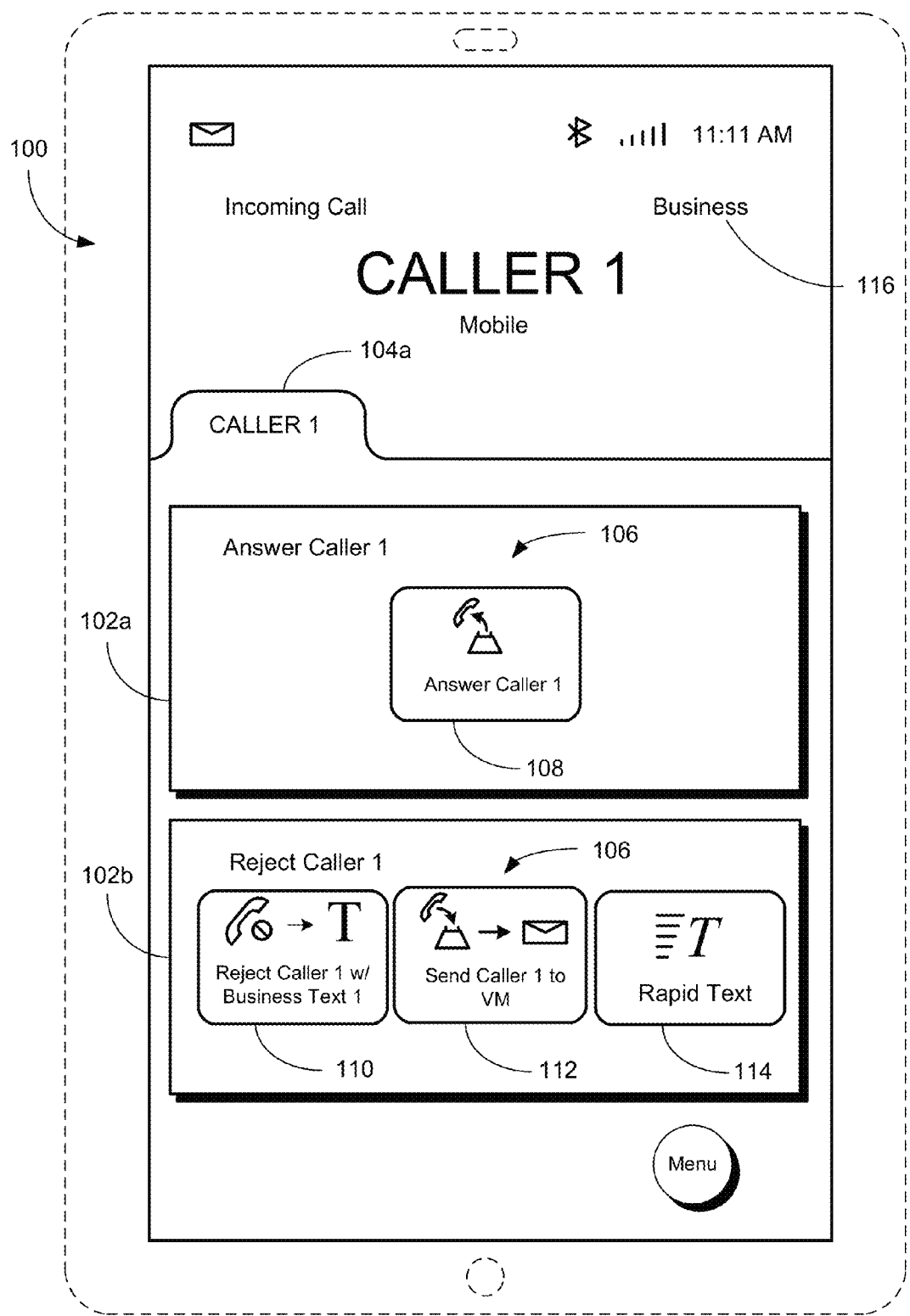
FIG. 1A depicts a one call graphical user interface (GUI) with an incoming business call, in accordance with some examples of the present disclosure.

Examples of the present disclosure relate generally to systems and methods for providing customizable graphical user interfaces (GUI) for call handling on mobile phones, tablets, and other network (e.g., cellular or Internet) connected devices (collectively, user's equipment or UEs). The system can include multiple customizable GUIs that enable users to handle one, two, three, or more calls by accepting, rejecting, placing calls on hold, sending text replies, and other options. The system can enable the user to handle multiple calls quickly and efficiently and can enable the user to customize their responses to calls based on their preferences.

To simplify and clarify explanation, the disclosure is described herein as systems and methods for use with cellular phones. One skilled in the art will recognize, however, that the disclosure is not so limited. While the systems and methods are useful in conjunction with cellular phones and call handling associated therewith, it should be understood that the systems and methods can just as easily be used for other network connected electronic devices, such as tablets, laptops, and personal computers. The system can be used anytime efficient, customizable call handling is desired to provide the user with an enhanced experience and to enable the user to provide improved service to incoming calls.

The systems and methods described hereinafter as making up the various elements of the present disclosure are intended to be illustrative and not restrictive. Many suitable systems, methods, and configurations that would perform the same or a similar function as the systems described herein are intended to be embraced within the scope of the disclosure.

Currently, no third-generation partnership project (3GPP) standard exists for multiple call handling and GUIs associated with multiple call handling. In addition, many current GUIs provide only limited, non-customizable options with regard to handling one or two additional calls (two or three total calls, respectively). These include, for example, the ability to reject an incoming call, place a current call on hold and swap to an incoming call, and some fixed text responses. These do not enable the user to customize these responses, however, or place additional options in an easy to use and configure GUI.

A user may wish, for example, to have customized text responses readily available to reply to different types of incoming calls. In other words, if a user is on a call (or multiple calls) and another call comes in, the user must choose whether to stay on the current call and reject the incoming call, or vice-versa. If the user decides to take the incoming call, for example, it is easy enough for the user to simply tell the current caller, "I have to take this other call, let me call you right back," or other suitable explanation.

If, the user decides to stay on the current call, however, it is significantly more difficult to explain to the incoming caller what is happening. Currently, the user can send the incoming call to voicemail (or just ignore it), swap to the other call and tell the incoming caller that they will call them back, or send a "canned" text message (e.g., "I'll call you in 10 min.). This type of response may not be appropriate for business calls, for example, and each user may wish to customize their choices based on their personal preferences and business needs.

If a user is on a call with a customer, for example, and a friend calls on another line, the user may wish to send a relatively informal text to the friend that says, for example, "I'm on the phone, call you right back!" If a user is on a call with a customer and another customer calls, on the other hand, the user may wish to send a more formal, or business-like, text to the incoming caller. The user may wish to send, for example, "Thank you for your call. I am not available to take your call at the moment, but I will return your call very shortly." Similarly, some users may wish to take certain actions, like staying on the current call and sending a text message to the incoming call, while other users may wish to take the incoming call more often. Thus being able to customize the actions that appear on the "home screen" for call handling, i.e., the screen that appears when a call is incoming, and being able to customize the actions themselves would be advantageous. It is to such systems and methods that examples of the present disclosure are primarily directed.

Figure 1B:
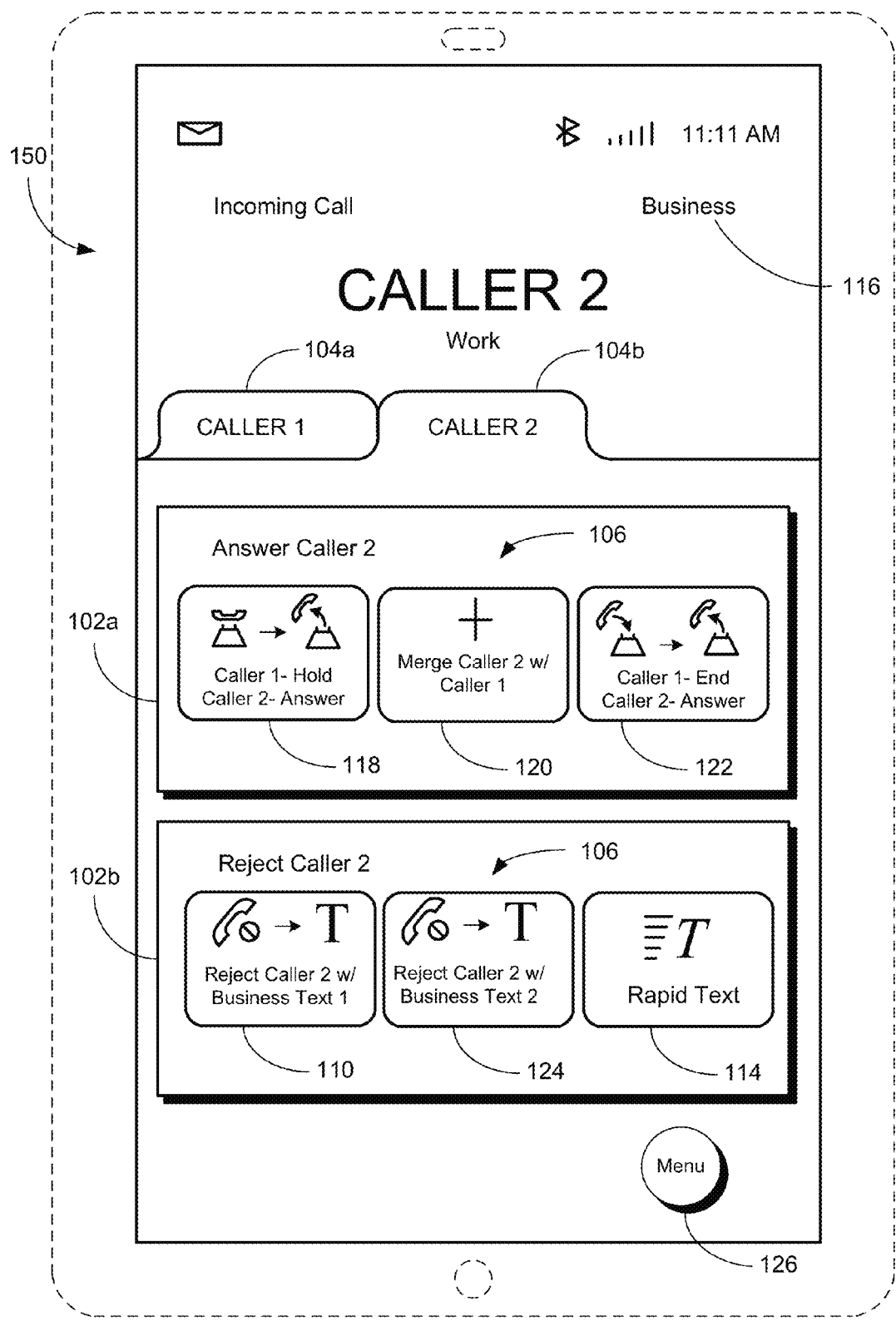
FIG. 1B depicts a two call GUI with an incoming business call, in accordance with some examples of the present disclosure.
Figure 2:
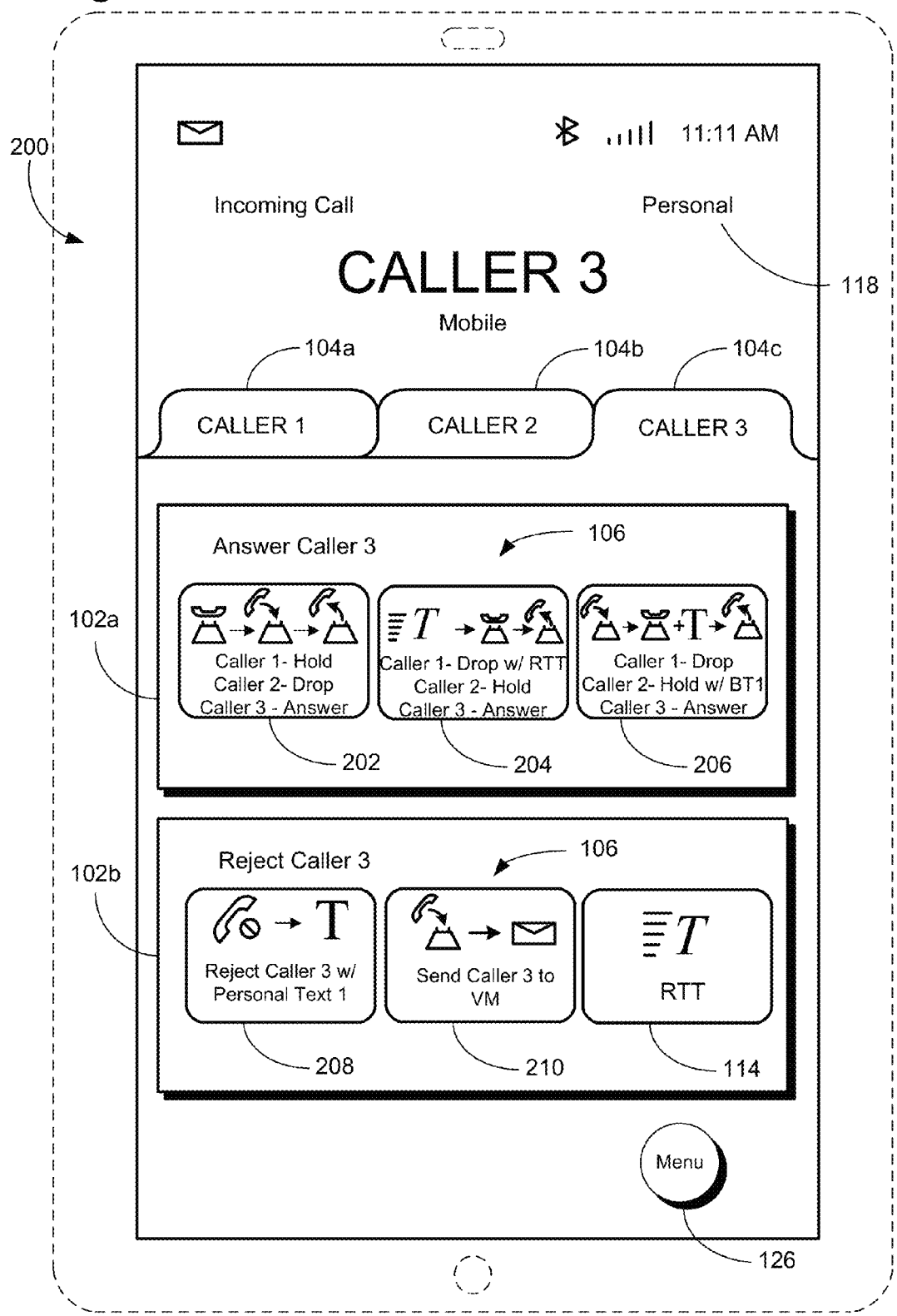
FIG. 2 depicts a three call GUI with an incoming personal call, in accordance with some examples of the present disclosure.

As shown when comparing FIGS. 1A, 1B, and 2, handling multiple calls can be more complicated than handling a single call. When attempting to handle a third incoming call, while already on two calls (FIG. 2), the combinations and permutations alone can be cumbersome. As a result, it would be helpful for the user to be able to customize call handling for one, two, three, or more calls to their personal preferences. This can enable the caller to efficiently handle calls based on whether they are business, personal, or family calls, among other things. It is to such systems and methods that examples of the present disclosure are primarily directed. As shown in FIG. 1A, the simplest use case is the handling of a single incoming call from "Caller 1." Providing a customizable one call GUI 100, can nonetheless provide useful choices regarding how the user prefers to handle calls when they are unavailable, for example, and for business calls versus personal calls, among other things.

As shown, in this case, a call is incoming from Caller 1, while no other call is active. In this configuration, a conventional GUI may provide two or three fixed choices such as, for example, answer Caller 1, send Caller 1 to voicemail, and reject with text, where the text is a generic text. As shown, in this case, however, the user is not only provided with more options, but each option is customizable to provide more efficient call handling for that user's needs.

The user obviously has two basic choices when it comes to Caller 1, they can answer or not answer. To this end, the one call GUI 100 can include an answer group 102a of function buttons and a reject group 102b of buttons. Thus, the user is presented with two clear groups 102 of buttons each related to either answering the incoming call or rejecting it. Each group 102 can also be customized with one or more buttons by the user for each type of call—business, personal, family, etc.

As shown when comparing FIGS. 1A, 1B, and 2, and discussed below, the GUIs 100, 150, 200 can include a tab 104 for each caller. As shown in FIG. 1A, therefore, a single tab 104a is shown for the incoming call from Caller 1. In contrast, as shown in FIG. 2, the GUI 200 can include three tabs 104a, 104b, and 104c for Caller 1, Caller 2, and Caller 3, respectively. This can enable the user to switch between callers and interfaces when desired.

As shown in FIG. 1A (which is a business call), for business contacts, the groups 102 of function buttons 106 can be geared towards how business calls are most often handled. In this case, because the user is not currently on a call, the answer group 102a may include an answer Caller 1 button 108 to answer the call as normal. Obviously, selecting the answer Caller 1 button 108 connects Caller 1 to the user and the call commences.

If the user is busy, on the other hand, or simply does not want to take the call, the user can select a function button 106 from the reject group 102b. So, for example, the user may include a pre-configured business text button 110, a send to voicemail button 112, and a rapid text button 114. As discussed below, with reference to FIG. 2, the groups 102 may be completely different for, for example, multiple call handling, personal calls versus business calls, or from user to user.

The one call GUI 100 can include one or more pre-configured business text buttons 110. As the name implies, the pre-configured business text button 110 can enable the user to send a text message pre-configured by the user to Caller 1. Because the user is rejecting Caller 1, rather than talking to them, it can be useful to give Caller 1 an explanation, for example, rather than just sending Caller 1 to voicemail. This can include explaining why the user cannot take their call right now and/or when they will return their call, among other things.

In this business context, the user can configure the pre-configured business text button 110 to send a more formal or courteous text message suitable for business contacts—as opposed to personal contacts, which may be more casual or humorous. So, for example, the business text 1 button 110 may read, "Thank you for your call. I apologize, but I am unavailable to take your call right now. I will call you back as soon as possible." The user can also configuration additional pre-configured business text buttons with a different, but similarly professional and/or formal text message.

In some examples, the one call GUI 100 can also include a send Caller 1 to voicemail button 112. As the name implies, this simply sends Caller 1 to voicemail and stops the user's phone from ringing. This may be useful to enable the user to quickly silence their phone (e.g., when they are in a meeting) or to prevent Caller 1 from hanging up before leaving a message, among other things.

Figure 6:
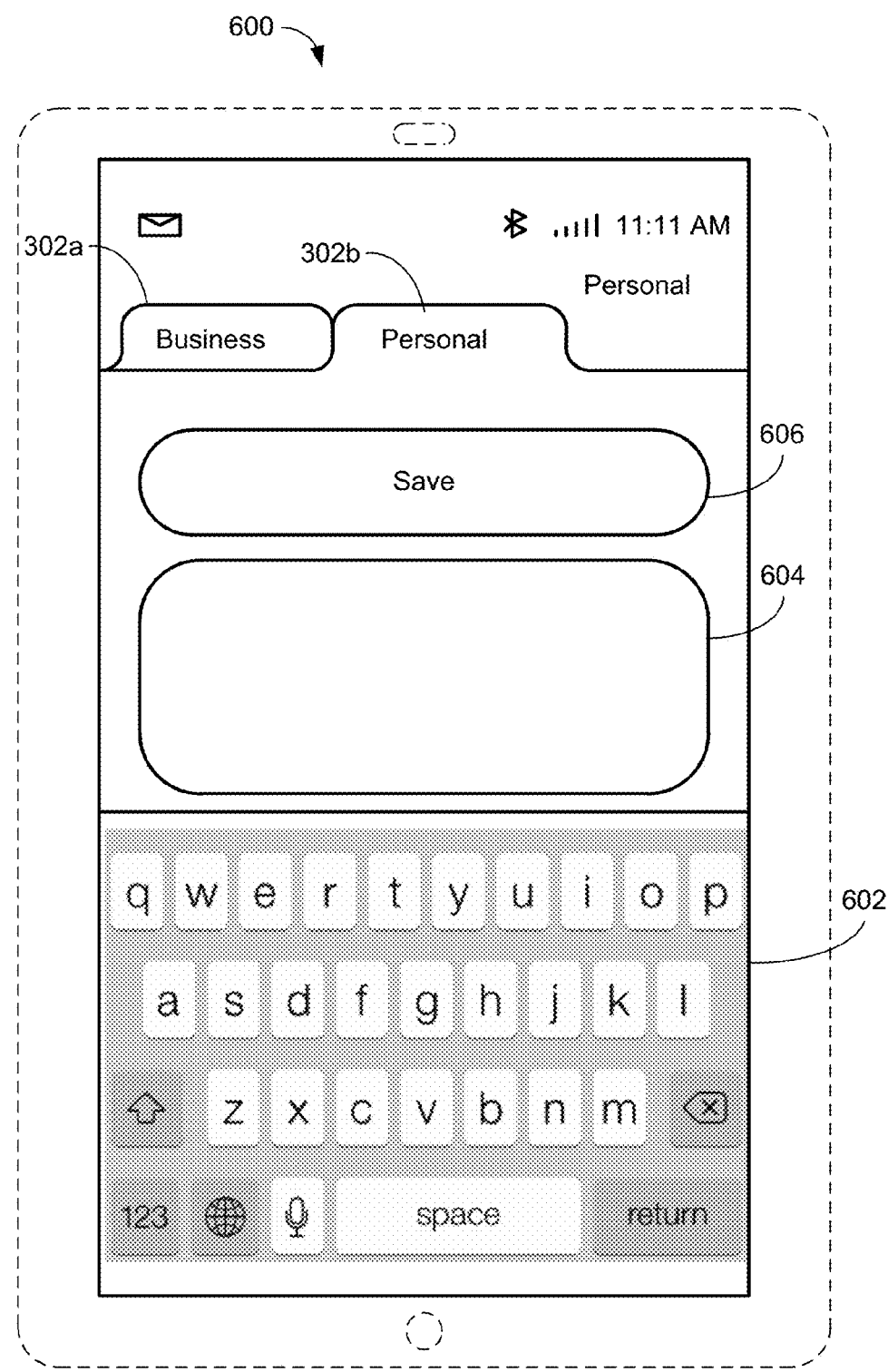
FIG. 6 depicts a text interface, in accordance with some examples of the present disclosure.

In some examples, the one call GUI 100 can also include a rapid text button 114. The rapid text button 114 can enable the user to send a personalized text message quickly without having to exit the one call GUI 100 or having to open the text messaging utility separately. If the pre-configured business text button 110 is inappropriate or inapplicable for a particular client, for example, or the user wished to provide Caller 1 with more specific information with the rapid text button 114. As shown in FIG. 6 and discussed below, the user can press the rapid text button 114 and type a text directly into a text interface 600 without exiting the one call GUI 100. This can enable the user to type and send a text message more quickly and efficiently. Thus, the user may type a customized message to a client he represents such as, for example, "I am in a meeting with the buyer right now. Call you right back with the new terms."

In some examples, in addition to sending a text message, the incoming call may also be sent, or may be given the option to be sent, to voicemail. In some examples, Caller 1 can first be sent the text message and then after a predetermined amount of time, be sent to voicemail. In some examples, each text message can include information related to accessing the voicemail system. Alternatively, any or all of the text message buttons 110, 114, for example, can include a link or applet to enable Caller 1 to choose to go to voicemail after receiving the text message.

Using either the pre-configured business text button 110 or the rapid text button 114, Caller 1 has been alerted that the user is not available and why, rather than simply sending Caller 1 to voicemail. This can avoid any confusion on the caller's part and can prevent the caller from feeling neglected. In some examples, one of the preconfigured text messages can also include a reference to a return call—e.g., "I apologize, I am temporarily indisposed. I will call you back within the next 10 minutes. If you would like to be sent to voicemail, please press 1 now. Otherwise, I will return your call shortly."

In some examples, each GUI—e.g., the one call GUI 100, the two call GUI 150, and the three caller GUI 200 (discussed below)—can include a call type designator 116. The call type designator 116 can be set when the user enters the contact into their contact list and can include a number of categories. The call type designator 116 can include, for example, personal, business, colleagues, close friends, and church. In some examples, the call type designator 116 can be customizable and can include many categories to provide additional granularity to the GUIs 100, 150, 200.

In some examples, each call type designator 116 can have a corresponding call handling GUI 100, 150, 200. In other words, the function buttons 106 and layout of each GUI 100, 150, 200 can vary based on the type of incoming call. Thus, while each 100, 150, 200 may have similar structures (e.g., each can have two clear groups 102 of function buttons 106), the specific function buttons 106 for each call type designator 116 can be different. In addition, based on the call type designator 116 of an incoming call and the number of active calls, the appropriate GUI 100, 150, 200 can automatically be selected for the call. As shown in FIG. 1, if a single call comes in from a business contact, for example, the business version of the one call GUI 100 can be automatically selected, including the most commonly used functions for a business call. Additional GUIs can be included, which include the most common functions for, for example, personal calls, church calls, or family calls, as appropriate. As discussed below with reference to FIGS. 1B and 2, the system can also enable multiple call handling, wherein each call has a different call type designator 116

As shown in FIG. 1B, therefore, examples of the present disclosure can comprise a GUI for handling multiple calls, in this case a two call GUI 150. As shown, in this example, a call is incoming from Caller 2, while the user is already on a call with Caller 1. In this configuration, a conventional GUI may provide two or three fixed choices such as, for example, answer Caller 2, send Caller 2 to voicemail, and reject with text, where the text is a generic, or "canned," text. In this case, however, the user is not only provided with more options, but each option is customizable to provide more efficient call handling for that user's needs.

The user obviously has two basic choices when it comes to Caller 2, they can answer or not answer. To this end, the two call GUI 150 can again include the answer group 102a of function buttons 106 and the reject group 102b of function buttons 106. Thus, the user is presented with two clear groups 102 of function buttons 106 each a specific version related to either answering the incoming call or rejecting it. And while in this case, both calls are from business contacts, each group 102 can also be customized by the user for each type of call—business, personal, family, etc. So, for example, if Caller 2 was a personal call, some or all of the function buttons 106 in the two call GUI 150 could be different.

As shown in FIG. 1B, for business contacts, the groups 102 can be geared towards how business calls are most often handled. So, for example, the answer group 102a can include a hold-and-answer button 118, a merge call button 120, and an end-and-answer button 122. The reject group 102b, on the other hand, can include two different pre-configured business text buttons 110, 124, and the rapid text button 114. As discussed below, with reference to FIG. 2, the groups 102 may be completely different for, for example, personal calls, family calls, and business calls, among other things.

The hold-and-answer button 118, merge call button 120, and end-and-answer button 122 can have their usual functions. The hold-and-answer button 118 can enable the user to place Caller 1 on hold and answer Caller 2. Because the user is already on the call with Caller 1, the user can simply explain that they have another call and they will be right back. In other words, it is likely not necessary to send Caller 1 a text message or other explanation as to why they are on hold, it can simply be explained to Caller 1 by the user before switching over.

As normal, the merge call button 120 can add the incoming call (Caller 2) to the current call (Caller 1) to conduct a conference call. This may be particularly useful on business calls when multiple parties are negotiating a deal, for example, or conducting a meeting. As the name implies, the end-and-answer button 122 can end the call with Caller 1 and answer Caller 2. Again, because the user is on the call with Caller 1, he can simply say good bye to Caller 1 if their business is concluded, for example, or tell Caller 1 that he will call him right back.

The two call GUI 150 can also include one or more pre-configured business text buttons 110, 124. As the name implies, these pre-configured business text buttons 110, 124 can enable the user to send a pre-configured text message to Caller 2. Because the user is rejecting Caller 2, but is not yet talking to them, it can be useful to give Caller 2 an explanation (e.g., rather than just sending Caller 2 to voicemail). This can include explaining why the user cannot take their call right now, when they will return their call, or other pertinent information.

In this business context, the user can configure these pre-configured text buttons 110, 124 to send more formal, technical, or courteous text messages suitable for business contacts—as opposed to personal or family contacts, for example, which may be more casual or humorous. So, for example, the business text 1 button 110 may read, "Thank you for your call. I apologize, but I am unavailable to take your call right now. I will call you back as soon as possible." The business text 2 button 124 can be configured with a different, but similarly professional and/or formal text message.

In some examples, the two call GUI 150 can also include the rapid text button 114. As discussed above, the rapid text button 114 can enable the user to send a personalized text message quickly without having to exit the two call GUI 150, without having to open the text messaging utility separately, and without leaving the call with Caller 1. If none of the pre-configured text buttons 110, 124 are appropriate for a particular client, for example, or the user wishes to provide Caller 2 with specific information, the user can press the rapid text button 114 and type a text directly into the text interface 600 without exiting the two call GUI 150. This can enable the user to type and send a text message more quickly and with little, or no, disruption to the current call. Thus, the user may type a message to a client he represents, "I am on with the call with the buyer right now. Call you right back with the new terms."

In some examples, in addition to sending a text message, the incoming call may also be sent, or may be given the option to be sent, to voicemail. In some examples, the user can first be sent the text message and then after a predetermined amount of time, be sent to voicemail. In some examples, each text message can include information related to the voicemail system. Alternatively, any or all of the text message buttons 110, 114, 124 for example, can include a link or applet to enable the user to choose to go to voicemail in addition to receiving the text message.

In either configuration, the user has been alerted that the user is not available, rather than simply sending the user to voicemail. This can avoid any confusion on the caller's part and can prevent the caller from feeling neglected. In some examples, one of the preconfigured text messages can also include a reference to a return call—e.g., "I apologize, I am temporarily indisposed. I will call you back within the next 10 minutes. If you would like to be sent to voicemail, please press 1 now. Otherwise, I will return your call shortly."

In some examples, each GUI 100, 150, 200 can include a version associated with each call type designator 116. The call type designator 116 can be set when the user enters the contact into their contact list and can include a number of categories, as discussed above. The call type designator 116 can include, for example, personal, business, colleagues, close friends, and church. In some examples, the call type designator 116 can be customizable and can include many categories to provide additional granularity to the GUIs 100, 150, 200.

In some examples, each call type designator 116 can have a corresponding call handling GUI 100, 150, 200. In addition, based on the call type designator 116 of an incoming call and the number of active calls, the appropriate GUI 100, 150, 200 can automatically be selected for the call. As shown in FIG. 1, if a single business call comes in, the business version of the one call GUI 100 can be automatically selected, including the most commonly used functions on a business call. As discussed below with reference to FIG. 2, when a personal call comes in, on the other hand, the personal version of the three call GUI 200 can automatically be selected. As discussed below with reference to FIG. 3, the system can also include a customizing GUI 300 to enable the number and selection of function buttons 106 for each GUI 100, 150, 200 and each call type designator 116 to be customized to the user's preferences and needs.

In some examples, the GUIs 100, 150, 200 can comprise any number of function buttons 106. If the number of function buttons 106 exceeds the size of the one call GUI 100, for example, a scrollbar, or similar, can be used to enable the user to access off-screen function buttons 106. In other examples, for convenience and efficiency, the GUIs 100, 150, 200 may limit the number of function buttons 106 to that which can be displayed on a single screen. This can enable the user to access these function buttons 106 directly without accessing additional menus or scrollbars.

As shown, the GUIs 100, 150, 200 may limit the number of function buttons 106 to the four or six most appropriate function buttons 106, with additional function buttons 106 available manually via a menu button 126. The menu button 126 can enable the user to access additional menus, functions, or tabs to access additional features. In other words, if the particular function button 106 the user wished to select is not shown on the "home screen" of the GUI 100, 150, 200, then the user can select the menu button 126 to access additional function buttons 106.

Of course, some calls will come in from unknown callers, callers with blocked caller IDs, or from callers for whom a call type designator 116 has not been selected. In this case, the system can also include a "default" GUI, which can also be configurable. The default GUI can be used, and can be selected automatically by the system, when a call type designator 116 has not been designated by the user or when no GUI has been configured for a particular call type designator 116—e.g., the user has set the call type designator 116 to "family," but has not yet set up the family version of the GUIs 100, 150, 200. In the case where the user does not know the caller, some users may want the send-to-voicemail button 210 (discussed below) to be readily available, for example. Entrepreneurs, on the other hand, may wish to give unknown callers immediate attention, as they may be potential clients or investors. In this case, the default GUI may configured with the hold-and-answer button 118 prominently featured, for example, to enable the user to quickly switch over to the incoming call. Regardless, like the other GUIs 100, 150, 200, the user can configure the default GUI to suit their needs for unknown, or uncategorized, callers.

As shown in FIG. 2, the system can also include a three call GUI 200. In this case, the three call GUI 200 is shown for a Caller 3 that is a personal caller (e.g., a friend rather than a business associate). Thus, as discussed above, when receiving a personal call, the personal version of the three call GUI 200 can automatically be selected based on the call type designator 116 (e.g., personal). As before, the three call GUI 200 can include two groups 102 of function buttons 106. The answer group 102a can be focused on answering the incoming call, while the reject group 102b can be focused on rejecting the incoming call.

In some examples, because each GUI 100, 150, 200 is customizable, some, or all, of the function buttons 106 on the three call GUI 200 may be different than the function buttons 106 on the one call GUI 100 or the two call GUI 150. Similarly, the three call GUI 200 itself can have different versions, with different function buttons 106, for different call type designators 116. In other words, the three call GUI 200, and indeed all the GUIs 100, 150, 200, can display the same or different function buttons 106 based on the call type designator 116 of the incoming call.

Obviously, as the current number of active calls increases, call handling can become somewhat more complicated. As shown in FIG. 2, examples of the present disclosure can also comprise a three call GUI 200. In this examples, the user is on a call with Caller 2, with Caller 1 on hold, when a third call from Caller 3 comes in. As always, the user has two overarching choices—answer Caller 3 or reject Caller 3. The three call GUI 200 can, therefore, provide several function buttons 106 in the answer group 102a and several function buttons 106 in the reject group 102b.

As shown, in this case, the answer group 102a can include call handling function buttons 106 that address all three calls—i.e., the two active calls with Caller 1 and Caller 2 and the incoming call from Caller 3. To this end, the answer group 102a can include, for example, a hold-drop-answer button 202, a drop with RT-hold-answer button 204, and a drop-hold with business text 1-answer button 206.

As the name implies, the hold-drop-answer button 202 can place (or leave) Caller 1 on hold, drop the call with Caller 2, and answer the call with Caller 3. As before, because the user is currently on the call with Caller 2, the user can simply end the call with Caller 2, for example, or explain to Caller 2 that they have to take the call and they will call them back. Because the user can simply talk to Caller 2, there is less need to send them to voicemail, for example, or to send them a text.

The drop with RT-hold-answer button 204, on the other hand, can drop Caller 1 with a rapid text, place Caller 2 on hold, and answer Caller 3. In this case, because Caller 1 is on hold, it can be useful to send a text message to Caller 1 explaining why the call is being dropped. The user may wish to send a text that says, for example, "I apologize, I have an emergency call from my daughter, I will call you back ASAP." This provides some explanation to Caller 1 why they have suddenly gone from being on-hold to being disconnected. As before, because the call with Caller 2 is currently active, the user can simply explain to Caller 2 that they have to take the call from Caller 3 and place them on hold to answer the call from Caller 3.

Similarly, the drop-hold with business text 1-answer button 206 can enable the user to drop Caller 1 (or send them to voicemail), place Caller 2 on hold, but provide them with "business text 1" and answer Caller 3. In this case, Caller 1 may be a friend, for example, for whom no explanation is required (e.g., the friend knows the user is busy and will call back later). Caller 2, on the other hand, can be a business associate. And, although the call with Caller 2 is active, the user may need to quickly switch over to Caller 3. This may be because Caller 3 is calling in an emergency, for example, or is simply a very important call for the user. In this manner, Caller 2 is given a text explanation (e.g., "business text 1") as to why they were placed on hold and they user is able to immediately answer the call with Caller 3 without having to provide a rushed explanation to Caller 2. Of course, there are myriad combinations and permutations for both the two call GUI 150 and the three call GUI 200, any of which can be created using the multi-call interface 700 discussed below with reference to FIG. 7.

The three call GUI 200 can enable the user to customize the personal function buttons 106 with function buttons 106 that are more commonly used for personal call (e.g., as opposed to a business call). As shown, this may include different function buttons 106 than on the one call GUI 100 because, for example, friends are more flexible and/or understanding, and less prone to be negatively impacted by more casual messaging and handling (e.g., simply dropping the call or send the caller to voicemail). Friends may expect to leave a voicemail during the day, for example, because they know the user is working. Customers, on the other hand, may feel as though they are not receiving good service if their calls are not answered, or at least acknowledged, immediately.

As before, the function buttons 106 in the reject group 102b are somewhat less complicated despite the number of calls, though they can still be customized for personal or business calls. In this case, because the user is receiving a personal call, they may be somewhat less concerned with formality and courtesy. They may know, for example, that when Caller 3 (a friend) calls, the friend will not be upset if they are sent to voicemail and will simply either (1) hang up and wait for a callback or (2) leave a message.

To this end, the user can select the reject with personal text 1 button 208 to reject the call with Caller 3 and/or send Caller 3 to voicemail (or provide them with the option) and provide them with "personal text 1." Personal text 1 can be a friendly, funny, or otherwise more informal message when compared to business text 1, for example. This enables the user to acknowledge Caller 3, yet stay on the current call with Caller 2. This can also enable the user to stop the beeping tone that indicates an incoming call (the "call-waiting" tone) and return to the call at hand.

Though only one is shown in FIG. 2, the three call GUI 200 can also comprise multiple personal text message buttons 208, each configured with a customized message. The reject with personal text 1 button 208 may include a simple, "On another call right now. Call you right back" text, for example, or, an "I will call you after work." text. As discussed below, the user can select additional personal text message buttons, each with a customized personal text message, using the customizing GUI 300.

The three call GUI 200 can also include a send Caller 3 to voicemail button 210 (without text). As discussed above, this may be acceptable because Caller 3 is a friend, for example, and may even expect to be sent to voicemail during business hours. The three call GUI 200 can also include the rapid text button 114. As before, the rapid text button 114 can enable the user to reject Caller 3 with a customized text, while staying on the call with Caller 2.

Figure 3:
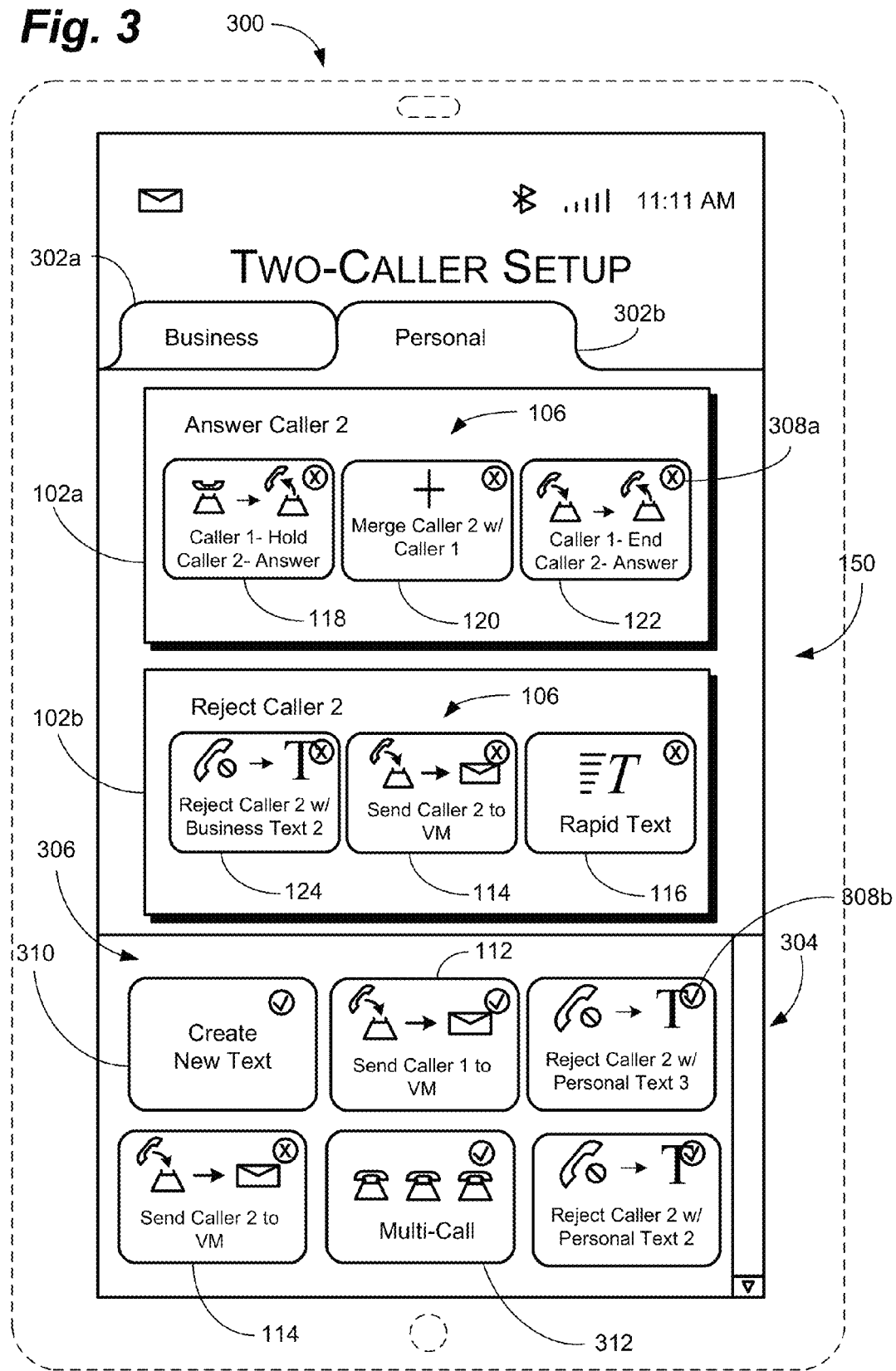
FIG. 3 depicts a customization module for the GUIs of FIGS. 1A-2, in accordance with some examples of the present disclosure.

As discussed above, each GUI 100, 150, 200 can be personalized for the user and the call type designator 116. Thus, the one call GUI 100 may have a personal and a business version, the two call GUI 150 may have a personal and a business version, etc. Thus, each GUI 100, 150, 200 may have different function buttons 106 for personal calls, business calls, family calls, etc. As shown in FIG. 3, therefore, the system can also include a customizing GUI 300 to enable the function buttons 106 and other features for each GUI 100, 150, 200 to be customized.

So, for example, FIG. 3 depicts the customizing GUI 300 in two-caller setup mode to enable the user to setup the two call GUI 150. Of course, though not shown, the customizing GUI 300 can also include a setup screen for the one call GUI 100, the three call GUI 200, or more GUIs. The customizing GUI 300 can have a setup screen for each type of GUI 100, 150, 200 and can have a separate tab 302 for each call type designator 116. As shown, the customizing GUI 300 can have a tab 302a for customizing business calls and a tab 302b for customizing personal calls. Of course, if there are additional call type designators 116 in use by the user, a tab 302 can be include for each additional call type designator 116 and for each GUI 100, 150, 200.

The customizing GUI 300 can include the function buttons 106 currently in use on the selected tab 302b—i.e., the function buttons 106 provided from the factory, for example, or previously configured by the user—and a customizing menu 304 including a plurality of additional function buttons 306 (i.e., in addition to, and including, the functions that are included with the GUI 150 by default) that are applicable to that particular GUI 100, 150, 200. In other words, because each GUI 100, 150, 200 is designed to handle a different number of calls, some of the functions buttons 106, and particularly those for answering calls, are different. In some examples, rather than customizing each GUI 100, 150, 200, the user can simply use the GUI 100, 150, 200 with the function buttons 106 that are chosen by default from the manufacturer or service provider. In other cases, the user can customize one, or all, of the GUIs 100, 150, 200 and tabs 302 to suit their personal preferences.

In some examples, the function buttons 106, 306 can be added to, or removed from, to the selected GUI 150 using a selector button 308 or similar. The user can remove existing function buttons 106 by selecting a remove button 308a—shown as an "X" button—by way of examples. The user can also add additional function buttons 106 to the GUI 200 by selecting the appropriate add button 308b—shown as a "checkmark" button—by way of examples.

Of course, the design, shape, and locations of the selector buttons 308 is somewhat arbitrary. Instead of selector buttons 308, the customizing GUI 300 could provide drag-and-drop functionality. In this configuration, the user can simply drag an existing function button 106 off the GUI 150 and into the customizing menu 304 to remove it. Similarly, the user can drag an additional function button 306 from the customizing menu 304 to the GUI 150 to add it. The customizing menu 304 could also comprise an "add" and "remove" drop down menu, checklists, buttons, or other means to enable the user to add and remove function buttons 106, 306 as desired.

In some examples, the customizing GUI 300 can also include a create new text button 310 and a new multi-call button 312. As discussed below with reference to FIG. 6, the create new text button 310 can enable the user to create new, pre-configured personal 208 or business 110, 124 text buttons. As discussed below with respect to FIG. 7, the new multi-call button 312 can enable the user to configure new two- or three-way call handling buttons for use with the two call GUI 150 or the three call GUI 200, respectively.

Figure 4:
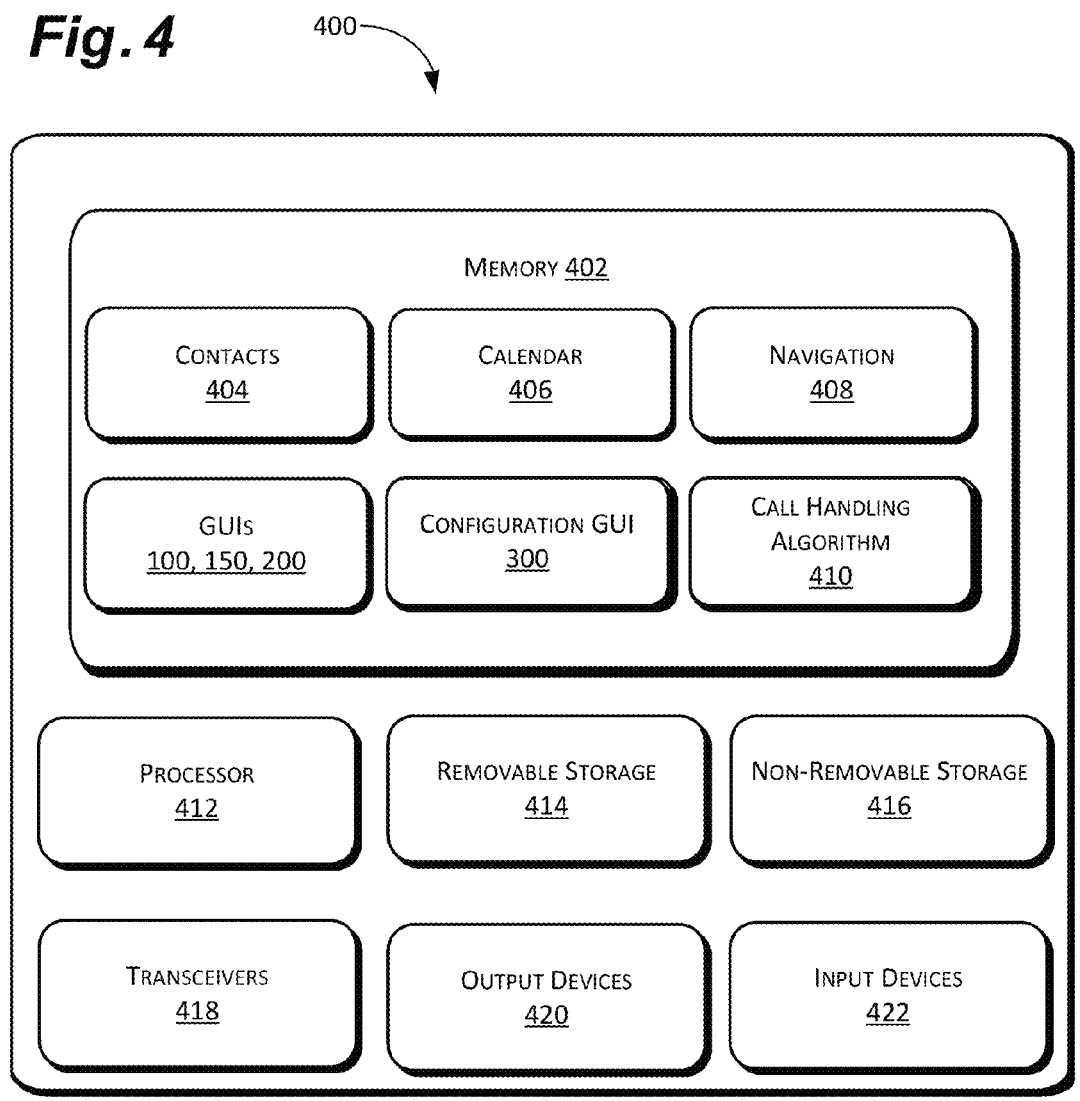
FIG. 4 is a component level schematic for a user equipment (UE) for use with the GUI of FIG. 1, in accordance with some examples of the present disclosure.

As shown in FIG. 4, any or all of the GUIs 100, 150, 200, 300 can be implemented on a variety of electronic devices, such as cell phones, smart phones, tablet computers, and laptops (collectively UE 400). The UE 400 can comprise a number of components to enable the GUIs 100, 150, 200 and customization GUI 300, among other things, to perform the above-mentioned functions. As discussed below, the UE 400 can comprise memory 402 including many common features such as, for example, the user's contacts 404, calendar 406, and navigation software 408. In addition, the memory 402 can also include the GUIs 100, 150, 200, the customization GUI 300, and a call-handling algorithm 410. The UE 400 can also include one or more processor(s) 412, removable storage 414, non-removable storage 416, transceivers 418, output device(s) 420, and input device(s) 422. The UE 400 may additionally contain a policy engine to receive, create, transmit, and manage the various messages and commands. In some examples, some or all of the functions associated with the GUIs, such as GUIs 100, 150, 200 and the customization GUI 300, can be handling by a remote server, or other remote network entity.

In various implementations, the memory 402 can be volatile (such as random access memory (RAM)), non-volatile (such as read only memory (ROM), flash memory, etc.), or some combination of the two. The memory 402 can also comprise contacts 404. The contacts 404 can include names, numbers, addresses, and other information about the user's business and personal acquaintances, among other things. As mentioned above, in some examples, the contacts 404 can also comprise a call type designator 116 to enable the GUIs 100, 150, 200 to select an appropriate tab 302 for an incoming call.

In some examples, the memory 402 can also include a calendar, or other software, to enable the user to track appointments and calls, schedule meetings, and provide similar functions. In some examples, the memory 402 can also comprise navigation software 408. Of course, the UE 400 can also include other software such as, for example, e-mail, text messaging, social media, and utilities (e.g., calculators, clocks, compasses, etc.).

In some examples, the memory 402 can also comprise a call-handling algorithm 410. As discussed below, with respect to FIG. 5, the call-handling algorithm 410 can update the GUI 100, 150, 200 automatically based on the previous and/or recent actions of the user during calls. If the user repeatedly uses one function button 106 during business calls, for example, then the call-handling algorithm 410 can update the appropriate GUI 100, 150, 200 to include this function button 106, or to include this function more prominently (e.g., the call-handling algorithm 410 can move this function button 106 to the top of the list or the left of the screen).

The UE 400 may also include additional data storage devices (removable and/or non-removable) such as, for example, magnetic disks, optical disks, or tape. Such additional storage is illustrated in FIG. 4 by removable storage 414 and non-removable storage 416. The removable storage 414 and non-removable storage 416 can store the various programs 404, 406, 408 and algorithms 410 to enable the UE 400 to be fully or partially configured and to enable the GUIs 100, 150, 200 and customizing GUI 300 to present welcome screens, setup menus, and other functions to the user via the GUI 100, 150, 200, customizing GUI 300, operating system (OS), and other programs and functions.

Non-transitory computer-readable media may include volatile and nonvolatile, removable and non-removable tangible, physical media implemented in technology for storage of information, such as computer readable instructions, data structures, program modules, or other data. The memory 402, removable storage 414, and non-removable storage 416 are all examples of non-transitory computer-readable media. Non-transitory computer-readable media include, but are not limited to, RAM, ROM, electronically erasable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 400. Any such non-transitory computer-readable media may be part of the UE 400 or may be a separate database, databank, or remote server.

In some implementations, the transceivers 418 include any sort of transceivers known in the art. In some examples, the transceivers 418 can include wireless modem(s) to facilitate wireless connectivity with the other UE 400, the Internet, and/or an intranet. Further, the transceivers 418 may include a radio transceiver that performs the function of transmitting and receiving radio frequency communications via an antenna (e.g., WiFi or Bluetooth®). In other examples, the transceivers 418 may include wired communication components, such as a wired modem or Ethernet port, for communicating with the other UE 400 or the provider's cellular or Internet-based network.

In some implementations, the output devices 420 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UE is connected to a network, the type of call being received, the number of active calls, etc. Output devices 420 also include ports for one or more peripheral devices, such as headphones, peripheral speakers, or a peripheral display.

In various implementations, output devices 420 include any sort of input devices known in the art. For example, output devices 420 may include a camera, a microphone, a keyboard/keypad, or a touch-sensitive display. A keyboard/keypad may be a standard push button alphanumeric, multi-key keyboard (such as a conventional QWERTY keyboard), a touchscreen, or one or more other types of keys or buttons, and may also include a joystick, wheel, and/or designated navigation buttons, or the like.

Figure 5A:
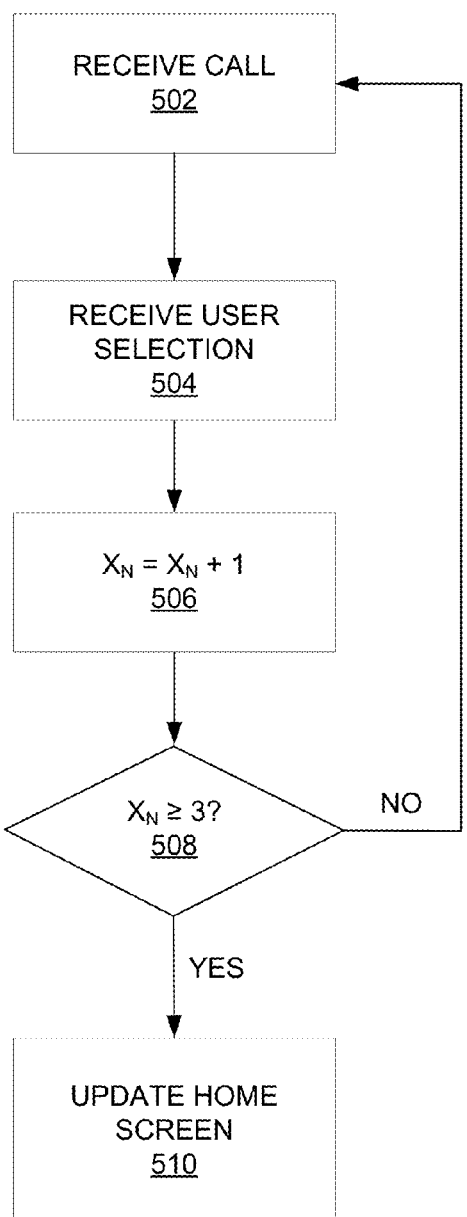
FIG. 5A is a flowchart depicting a method for reordering functions in the GUI according to use, in accordance with some examples of the present disclosure.
Figure 5B:
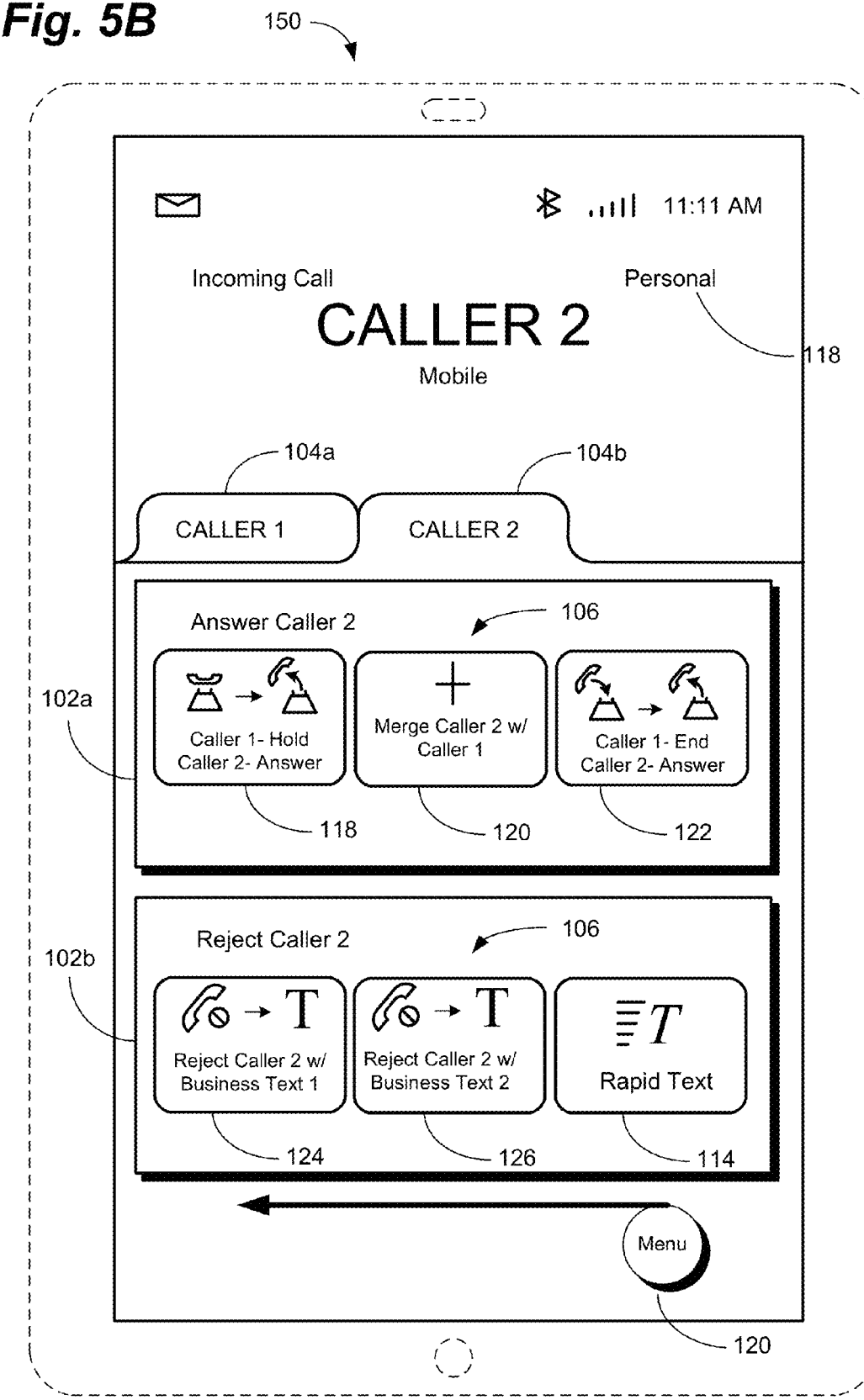
FIGS. 5B and 5C graphically depict reordering functions in the GUI according to use, in accordance with some examples of the present disclosure.
Figure 5C:
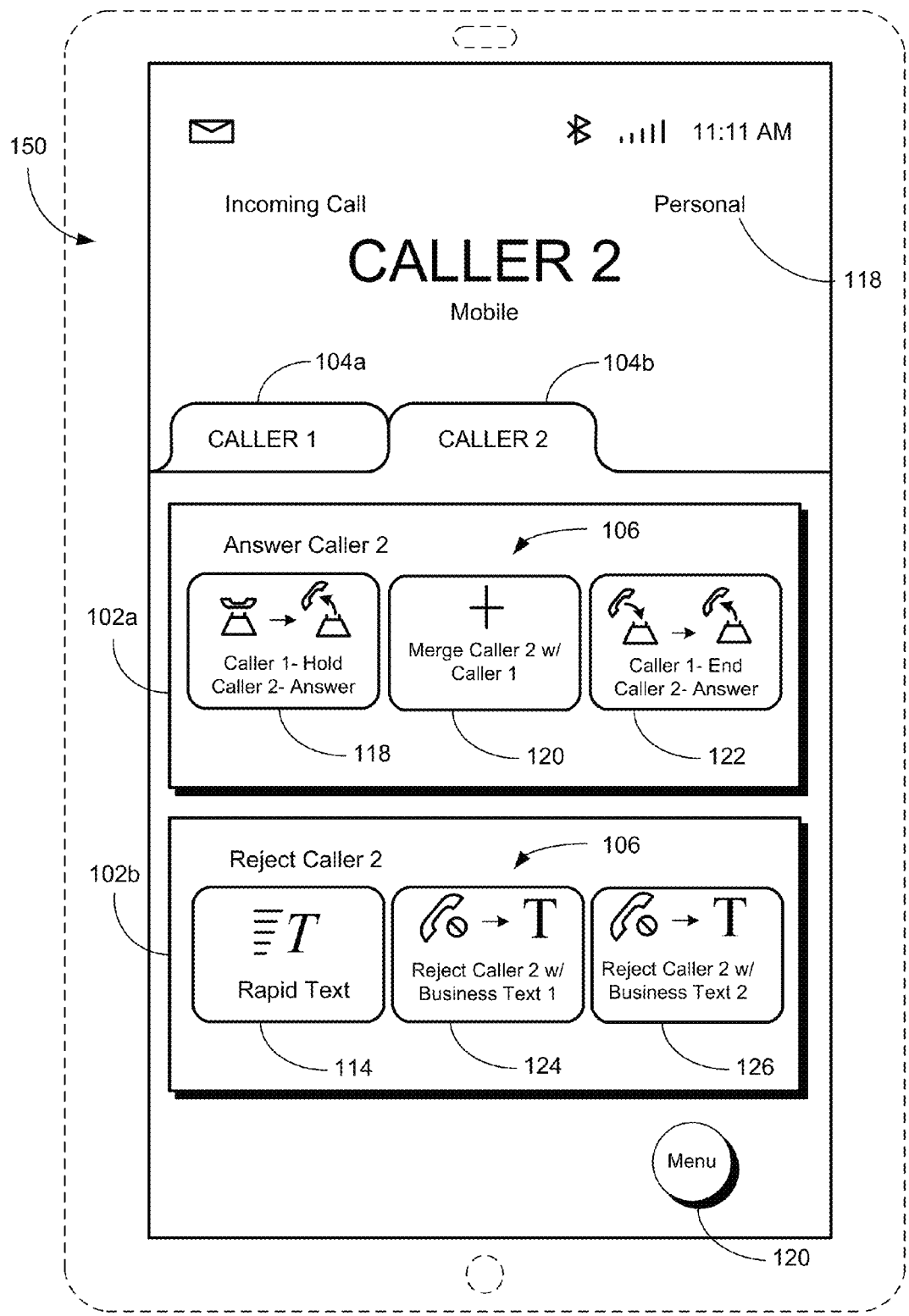

As shown in FIGS. 5A-5C and discussed above, examples of the present disclosure can also comprise a call handling algorithm 410 for updating the GUIs 100, 150, 200 according to the user's past preferences. In other words, in some examples, if a user repeatedly uses the send Caller 1 to voicemail button 112 during business calls, for example, this button can be moved to the upper row of the GUIs 100, 150, 200 or the left side of the reject group 102b, for example, to be more readily accessible. Similarly, if a user is forced to repeatedly use the menu button 126 to retrieve a function button 106 not included in the current configuration of the GUIs 100, 150, 200, the call handling algorithm 410 can update the GUIs 100, 150, 200 automatically after a predetermined number of uses.

As shown in FIG. 5A, at 502, therefore, the user can receive a call. As mentioned above, each contact can be identified by the user when stored in memory by using a call type designator 116. As a result, when the call appears on the screen, the correct version of the GUI 100, 150, 200 can automatically be selected. If a third call is received from a friend as shown in FIG. 2, for example, the personal version of the three call GUI 200 can be activated with the function buttons 106 preconfigured by the user for personal calls in that GUI 200.

At 504, the GUI 100, 150, 200 can then receive the user's selection for a function button 106 (e.g., they touch a button on the touchscreen of the UE 400). This can include function buttons 106 that are already on the GUI 100, 150, 200, or function buttons 106 that are not directly on screen, but are accessed using, for example, the aforementioned menu button 126 (or the OS of the UE 400). As discussed below, if the GUI 100, 150, 200 already contains the most frequently used features, the no action is necessary. If, on the other hand, the function buttons 106 should be changed, or reordered, based on the user's inputs, appropriate action can be taken.

At 506, the call handling algorithm 410 can track how many times each function button 106 has been accessed. As a result, a counter, $X_N$, can be employed for each function button 106. In other words, a first function button 106a can use $X_1$, a second function button 106b can use $X_2$, and so on. Each time the user accesses a particular function button 106, therefore, the corresponding counter can be incremented by one. The call handling algorithm 410 can then set a threshold at which the GUIs 100, 150, 200 will be updated.

At 508, the call handling algorithm 410 can determine if $X_N$ has reached, or crossed, the threshold. In this case, if $X_N \geq 3$, meaning the function has been used three times, then the threshold has been crossed and the decision tree returns a "yes." If $X_N \leq 3$, on the other hand, the end result is that $X_N$ is incremented by one, but no action is taken. In this case, the call handling algorithm 410 merely reverts to 502, when a new call is received. Of course, the threshold is arbitrary and can be different, or can be changed by the user.

In some examples, the user can set the call handling algorithm 410 to update a particular GUI 100, 150, 200 to always display the function button 106 that was last used in the left, middle, or right (whichever the user prefers) of the group 102, but leave the remaining functions as configured by the user. In other examples, the user can set the call handling algorithm 410 to update a particular GUI 100, 150, 200 to always display the last function button 106 that was used three times in the left, middle, or right of the group 102, but leave the remaining functions as configured by the user. In still other examples, the call handling algorithm 410 can maintain a running list of function button 106 used and update some, or all, of the functions on the tab 302 to be displayed in each group 102 in descending (or ascending) order of frequency of use. In this manner, the most frequently used function button 106 can be displayed in the most prominent location (e.g., in the middle of the tab, or in the upper left of the GUI 100, 150, 200), followed by the second most frequently used function button 106, etc. In still other examples, the call handling algorithm 410 can simply display the function buttons 106 in the order of last use. In other words, the last function button 106 used can be in the upper, left hand corner, the second to last function button 106 used can be in the upper middle position, and so on. Of course, what is deemed a "prominent" position within the GUI 100, 150, 200 can vary by user, location (e.g., whether the local language reads from left-to-right, up-and-down), and other factors; and is thus, somewhat arbitrary.

At 510, if the threshold has been met, on the other hand, then the GUI 100, 150, 200 can be updated. As mentioned above, if a particular function button 106 has been used the last three times or three times in a row, for example, then that function button 106 can be repositioned on the GUI 100, 150, 200. Alternatively, if a particular function button 106 has been used more than any other function button 106 on the GUI 100, 150, 200, then that function button 106 can be placed in a prominent position on the GUI 100, 150, 200, or in the group 102, to provide easy access. Both the threshold and the action can be customized by, for example, the UE manufacturer, the OS, or the user.

As shown in FIG. 5B, for example, if the user repeatedly uses the rapid text button 114 when receiving personal calls, then the rapid text button 114 can be relocated to a more prominent position in the GUI 150. In some examples, as shown in FIGS. 5B and 5C, the rapid text button 114 can be moved to the far left of the reject group 102b on the GUI 150. In some examples, the remaining function buttons 124, 126 can be moved to the right to complete the reconfiguration. Of course, if the function button 106 is not currently among the function buttons 106 on the homepage of the GUI 150 (e.g., it has been repeatedly selected using the menu button 126), then one of the existing function buttons 106 can be removed, or "demoted," from the GUI 150.

FIG. 5A is a flow diagram, illustrated by FIGS. 5B and 5C, of example processes discussed as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

As shown in FIG. 6, the GUIs 100, 150, 200 can enable both the number and content of the business text buttons 110, 124 and personal text buttons 208 to be configured and updated. If the user selects the create new text button 310 on the customization GUI 300, therefore, a text interface 600 can open to enable the user to enter a new preconfigured text message. The text interface 600 can include a keyboard 602 to enable the user to enter text, numbers, symbols, emoji, and other data. In some examples, the keyboard 602 can comprise a virtual keyboard on a touchscreen device. In other examples, the keyboard 602 can also include text-recognition to enable the user to enter data simply by speaking.

The text interface 600 can also include a text box 604 to show what is being entered and enable corrections, as necessary. The text box 604 can display text, numbers, symbols, emoji, and other data as it is being typed. In some examples, such as on a touchscreen device, the text box 604 can also enable data to be selected, copied, and pasted.

The text interface 600 can also include a text save button 606. When the user has entered the desired text and/or data, the user can select the text save button 606. In some examples, the text save button 606 can save the entered text message as a personal, business, or other type of text based on the tab 302 selected when the user pressed the create new text button 310. In other words, in FIG. 6, because the personal tab 302b is selected, and the user is configuring the two call GUI 150, the text message can be saved as a personal text message button (e.g., reject with personal text 1 button 208) by default. In other examples, the text save button 606 can invoke a save dialog that enables the user to select to which GUI 100, 150, 200 and call type designator 116 the message should be saved.

Similarly, the text interface 600 can assign the text message a number or address—e.g., reject with personal text 1 button 208, first business text button, second business text button, etc. In some examples, the number can be assigned based on the lowest available slot. If the current configuration of the GUIs 100, 150, 200 includes the reject with personal text 1 button 208, for example, then a subsequently entered personal text can be assigned to be the second personal text. The text messages can also be assigned absolute numbers or labeled in any other logical manner. In some examples, the save dialog can enable the user to name the entered text message, similar to naming a file on save in many OSs.

Figure 7:
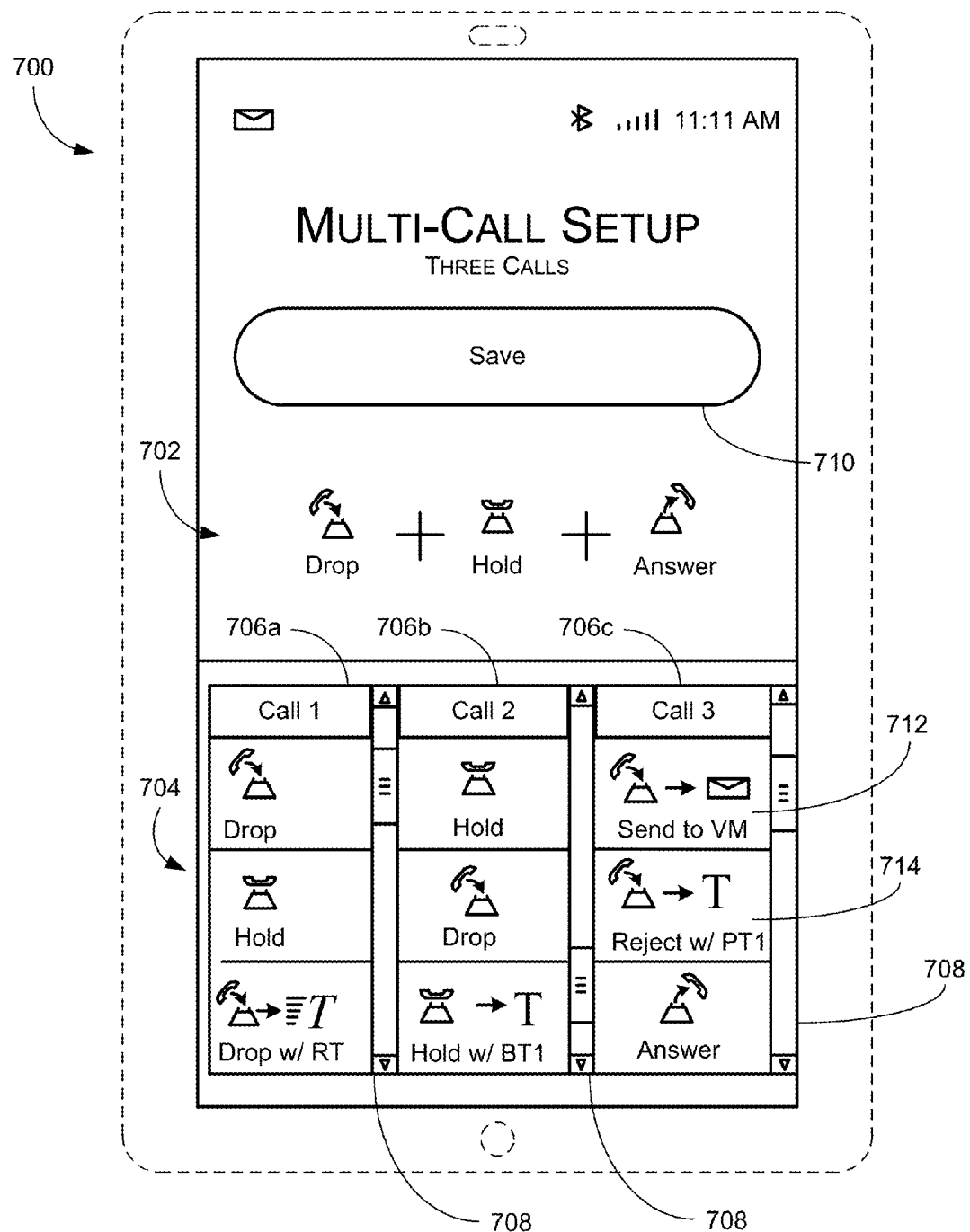
FIG. 7 depicts a multi-call interface, in accordance with some examples of the present disclosure.

As shown in FIG. 7, examples of the present disclosure can also comprise a multi-call interface 700 for configuring multiple call handling. Thus, if a user selects the new multi-call button 312 in the customizing GUI 300, the user can create s new two- or three-caller multi-call button 702 for use with the two call GUI 150 or three call GUI 200, respectively. As shown, the multi-call interface 700 can enable the user to configure multiple actions 704 for two or more calls to be incorporated into a custom multi-call button 702. In this manner, the user can customize multi-call handling to their personal preferences for each GUI 150, 200 and each call type designator 116. The multi-call interface 700 for creating a new three-call multi-call button 702 for the three call GUI 200 is shown. Of course, the multi-call interface 700 can also include a GUI for creating new two-call function buttons, which merely reduces the number of columns 706 of actions 704 from three to two (as discussed below).

The multi-call interface 700 can include a plurality of actions 704 to enable new multi-call buttons 702 to be created and saved for each call in a multi-call event. The user can simply choose an action 704 from each column 706 to create a new multi-call 702. So, for example, to create a new three-call button 702 (as shown), the user can select an action 704 from the first column 706a, the second column 706b, and the third column 706c. As the user selected each action 704, the multi-call button 702 can be updated and displayed in the multi-call interface 700. In some examples, each column 706 can include a slider 708, or similar, to enable the user to scroll through all of the actions 704 in each column 706. In this manner, the user can create a new multi-call button 702 with virtually any combination or permutation of actions 704.

When the user has configured the multi-call button 702 as desired, the user can select the function save button 710. The multi-call interface 700 can then create the new multi-call button 702, which, in this case, can be added to the customizing menu 304 for the three call GUI 200. As before, in some examples, the multi-call interface 700 can simply save the multi-call button 702 with the next available, or lowest, naming convention—e.g., "multi-call function 3." In other examples, the multi-call interface 700 can include a dialog box to enable the user to name the new multi-call button 702 (e.g., "Important Business Calls").

The multi-call interface 700 can enable the user to customize the GUIs 150, 200 further based on the user's needs. As discussed above with reference to FIG. 2, in a three-call scenario, for example, the user may not need a send to voicemail action 712 or a reject with personal text 1 action 714 for Caller 2 because that this the current call. In other words, if the user is on Caller 2 and a more important call comes in from Caller 3 (e.g., an emergency or a more important business call), the user can simply explain the situation to the caller to Caller 2 prior to hanging up.

In some examples, therefore, each column 706 of the multi-call interface 700 can include only those actions 704 relevant to a particular caller (e.g., Caller 1 vs. Caller 2 vs. Caller 3). In other examples, to simplify the multi-call interface 700, all actions 704 can simply be listed in each column 706, and the user can choose the appropriate actions 704 for each caller. In either case, the user can customize the multi-call function 702 by selecting different combinations and permutations of actions 704 from each column 706 to serve different needs for each call.

Of course, the multi-call interface 700 can also include facilities for creating new multi-call buttons for two calls for use with the two call GUI 150. In this configuration, the multi-call interface 700 can be substantially the same, but may only include two columns 706 of actions 704. This can enable the user to customize the multi-call buttons available on the two call GUI 150.

While several possible examples are disclosed above, examples of the present disclosure are not so limited. For instance, while a systems and methods for use with various electronic equipment has been disclosed, the system could be used on electronic equipment not mentioned, or other types of equipment without departing from the spirit of the disclosure. In addition, the location and configuration used for various features of examples of the present disclosure such as, for example, the order of steps, the layouts of the GUIs 100, 150, 200 or customizing GUI 300, can be varied according to a particular device, touchscreen, or OS that requires a slight variation due to, for example, the size or construction of the device or display, power or battery constraints, or accessibility concerns. Such changes are intended to be embraced within the scope of this disclosure.

The specific configurations, method steps, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system to handle multiple calls on a user equipment (UE), the system comprising:
   a plurality of graphical user interfaces (GUIs), each GUI associated with (1) a predetermined number of callers and (2) a predetermined call type designator, each of the plurality of GUIs comprising:

an answer group comprising a plurality of function buttons associated with answering an incoming call; and a reject group comprising a plurality of function buttons associated with rejecting the incoming call;

wherein the system automatically selects a GUI from the plurality of GUIs based at least in part on a current number of active calls and the call type designator of the incoming call.

2. The system of claim 1, wherein at least one function button of the plurality of function buttons in the reject group comprises a reject with pre-configured text button to reject the incoming call with a pre-configured text message.

3. The system of claim 2, wherein the pre-configured text message comprises a personal text message or a business text message.

4. The system of claim 1, further comprising a menu button displayed on each of the plurality of GUIs to enable one or more function buttons not displayed on a homepage of each respective GUI to be accessed by a user.

5. The system of claim 1, wherein at least one function button of the plurality of function buttons in the reject group comprises a rapid text button to reject the incoming call with a customized text message created contemporaneously with the rejection of the incoming call.

6. The system of claim 1, wherein the incoming call comprises a second or third active call; and wherein at least one function button of the plurality of function buttons in the answer group comprises a multi-call button including two or more actions associated with answering or rejecting the second or third active call.

7. An electronic device comprising:
a display to display at least a plurality of function buttons associated with a plurality of call-handling actions, the plurality of function buttons arranged in a first configuration;
one or more input devices to receive inputs from a user;
a transceiver to receive a call from a caller;
one or more processors in communication with at least the display and the one or input devices; and
memory storing computer-executable instructions that, when executed, cause the one or more processors to perform acts to:
determine that the call has been received by the transceiver of the electronic device;
receive a signal associated with a selection of a first function button of the plurality of function buttons;
increment a counter associated with the first function button by one;
determine that the counter is equal to, or greater than a threshold; and
cause the display to reconfigure the plurality of function buttons in a second configuration in response to the threshold being met.

8. The device of claim 7, wherein causing the display to reconfigure to display the plurality of function buttons in a second configuration comprises displaying the first function button in an upper, left hand corner of the display.

9. The device of claim 7, wherein causing the display to reconfigure to display the plurality of function buttons in a second configuration comprises displaying the first button in a left side of an answer group or a reject group.

10. The device of claim 7, wherein causing the display to reconfigure to display the plurality of function buttons in a second configuration comprises displaying the plurality of function buttons in descending order of frequency of use.

11. The device of claim 7, wherein determining that the counter is equal to, or greater than a threshold comprises determining that the counter is equal to or greater than three.

12. A method for creating a customizable graphical user interface (GUI) for call handling, the method comprising:
receiving a plurality of contacts from a user at an input of a user equipment (UE), each contact including at least a call type designator;
displaying a first tab on a display of the UE for a first call type designator;
displaying a second tab on the display of the UE for a second call type designator;
receiving a selection of a first group of function buttons for the first tab at an input of the UE;
receiving a selection of a second group of function buttons for the second tab from the user at an input of the UE;
displaying a first group of function buttons on the first tab on the display; and
displaying a second group of function buttons on the second tab on the display.

13. The method of claim 12, wherein the first group and the second group contain at least one different function button.

14. The method of claim 12, further comprising:
receiving, at an input of the UE, a signal associated with a selection of a customize button on the first tab;
displaying, on the display, a customizing menu comprising third group of function buttons;
receiving, at an input of the UE, a signal associated with a selection of a third group of function buttons for the first tab; and
displaying a fourth group of function buttons on the first tab on the display;
wherein the fourth group of function buttons comprises one or more function buttons from the first group and one or more function buttons from the second group.

15. The method of claim 14, further comprising:
receiving, at an input of the UE, a signal associated with the selection of a create new text button;
receiving, from the input of the UE, text associated with a customized text message;
receiving, at the input of the UE, a selection of a save button; and
adding a new text message function button to the fourth group of function buttons.

16. The method of claim 14, further comprising:
receiving, at an input of the UE, a selection of a create multi-call function button;
receiving, at the input of the UE, a signal associated with a selection of a first action for a first call of a multi-call;
receiving, at the input of the UE, a signal associated with a selection of a second action for a second call of the multi-call;
receiving, at the input of the UE, a signal associated with a selection of a save button; and
adding a new multi-call function button to the fourth group of function buttons.

17. The method of claim 16, further comprising:
receiving, at the input of the UE, a selection of a third action for a third call of a multi-call prior to receiving the signal associated with the selection of the save button;
wherein the new multi-call function button includes the third action.

18. The method of claim 17, wherein the first function, the second function, and the third function are different functions.

19. The method of claim 12, wherein the first call type designator is associated with personal calls; and
   wherein the second call type designator is associated with business calls.

20. The method of claim 12, wherein the first tab and the second tab each comprise an answer group of function buttons and a reject group of function buttons.

* * * * *